(12) United States Patent
Davis

(10) Patent No.: US 12,178,189 B1
(45) Date of Patent: Dec. 31, 2024

(54) REMOVABLE CONTAINER FOR LIVESTOCK TAGS

(71) Applicant: CattleGuard Solutions LLC, Olney, TX (US)

(72) Inventor: Jill Davis, Olney, TX (US)

(73) Assignee: CattleGuard Solutions LLC, Olney, TX (US)

( * ) Notice: Subject to any disclaimer, the term of this patent is extended or adjusted under 35 U.S.C. 154(b) by 0 days.

(21) Appl. No.: 18/621,436

(22) Filed: Mar. 29, 2024

Related U.S. Application Data

(60) Provisional application No. 63/591,030, filed on Oct. 17, 2023.

(51) Int. Cl.
*A01K 13/00* (2006.01)
*A01K 11/00* (2006.01)

(52) U.S. Cl.
CPC .......... *A01K 13/003* (2013.01); *A01K 11/001* (2013.01)

(58) Field of Classification Search
CPC .. A01K 11/001; A01K 11/002; A01K 11/004; A01K 11/006; A01K 11/007; A01K 11/008; A01K 13/003; A01K 27/007
See application file for complete search history.

(56) References Cited

U.S. PATENT DOCUMENTS

| | | | |
|---|---|---|---|
| 4,428,327 A | 1/1984 | Steckel | |
| 4,574,742 A * | 3/1986 | Morgan, Jr. | ........... A01K 11/00 119/654 |
| 4,612,877 A | 9/1986 | Hayes et al. | |
| 4,694,781 A | 9/1987 | Howe et al. | |
| 2006/0116640 A1 * | 6/2006 | Trompen | .................. A61D 7/00 604/131 |
| 2006/0198857 A1 | 9/2006 | Casagrande | |
| 2007/0057085 A1 * | 3/2007 | Trompen | ............. A01K 11/001 239/34 |
| 2012/0285056 A1 * | 11/2012 | Corrales, Jr. | ........ A01K 11/002 40/301 |
| 2015/0122197 A1 * | 5/2015 | Kellerby | ............. A01K 13/003 119/655 |
| 2018/0352784 A1 * | 12/2018 | Theno | .................. A01K 13/003 |

(Continued)

FOREIGN PATENT DOCUMENTS

| | | |
|---|---|---|
| JP | H09154470 | 6/1997 |
| KR | 100391490 | 7/2003 |

OTHER PUBLICATIONS https://www.command.com/3M/en_US/command/products/~/Command-Large-Picture-Hanging-Strips/?N=5924736+3294529207+3294737318&preselect=8706801+3293786499&rt=rud, last visited Mar. 18, 2024

(Continued)

*Primary Examiner* — Trinh T Nguyen
(74) *Attorney, Agent, or Firm* — DUNLAP CODDING, P.C.

(57) ABSTRACT

An animal health product container is described. The animal health product container is provided with a body, a bonding material and a pull tab. The body has a first face and a second face. The body is constructed of a weather resistant material impregnated with an animal health product compound. The bonding material attached to the first face of the body. The bonding material is configured to be weather resistant and allow the body to be removably attached to a tag body of an identification tag for an animal. The pull-tab is attached to the body, the pull tab devoid of the bonding material.

11 Claims, 5 Drawing Sheets

(56) References Cited

U.S. PATENT DOCUMENTS

2020/0164193 A1* 5/2020 Williams ............ A01K 11/001
2022/0047367 A1* 2/2022 Brandao ................. A61D 7/00

OTHER PUBLICATIONS https://www.prolabel.com/EasyUp3x1inchClearTabSealLabelSticker500RollEU31CLR, last visited Mar. 18, 2024.
https://web.archive.org/web/20140825121532/http://www.ortho.com/smg/goprod/ortho-home-defense-fly-bait-decal-for-windows/prod11120009/, last visited Mar. 19, 2024.
Advances in Transdermal Drug Delivery; World Small Animal Veterinary Association World Congress Proceedings, 2013, Paul Mills, BVSc, PhD, MANACVSc, School of Veterinary Science, The University of Queensland, QLD, Australia, 2013.

* cited by examiner

REMOVABLE CONTAINER FOR LIVESTOCK TAGS

CROSS REFERENCE TO RELATED APPLICATIONS

This application claims the benefit of U.S. Provisional Patent Application No. 63/591,030, filed Oct. 17, 2023, which is hereby incorporated herein by reference in its entirety.

BACKGROUND

Identification animal ear tags for livestock such as cattle, hogs and the like are in widespread use. The most popular forms of these tags comprise two components formed of plastic or similar resilient material that may be attached to the ear of the livestock by piercing a component through the ear of the livestock. Typically, such tags include identification numbers and/or are made in different colors to provide identifying information concerning the animal wearing the tag. Identification tags may take other forms such as a single-piece identification tag, an EIN button tag, a neck band identification strip, and a neck band identification tag.

Various techniques also have been devised for using such tags to release insecticides or insect repellent either through separately applied tags or by adding a carrier of some type to the identification ear tag.

In one such approach, the tag itself is made of a material impregnated with an insecticide which bleeds out over a period of time to provide control over flies and other insects. The problem with the use of an impregnated livestock tag is that within a relatively short period of time the insecticide is used up. If continued insect control is desired, the ear tag itself must be removed and replaced with a new tag. This is time consuming and requires the formation of another hole in the animal's ear to apply and/or reapply a new insecticide tag.

In another approach, a separate disc made of a carrier impregnated with insecticide is made to slide over the pin of the ear tag. When the insecticide is used up, the disc must be removed from the pin and then a new disc must be placed over the pin. However, this disc replacement is a cumbersome operation.

Accordingly, it is desirable to provide an animal health product compound delivery system that releases an animal health product over a period of time to provide a health benefit to the animal, such as controlling flies and other insects which may be used in conjunction with any and all commercially available livestock tags. It further is desirable to provide such an animal health product compound delivery system which is easy to apply and is easy to remove and replace without requiring any additional holes in the animal's ear.

SUMMARY OF THE INVENTION

The systems and methods described herein solve these and other problems by providing an animal health product delivery system in the form of a removable sticker which may be attached to any and all livestock tags and is easy to apply and to remove. In some embodiments, the animal health product sticker may include a container capable of holding the animal health product in liquid or solid form for use in conjunction with any and all conventional tags. In some embodiments, the animal health product sticker may be designed for attachment to an attachment button of an unmodified conventional or RFID animal tag, such as an ear identification tag. The animal health product sticker may be attached to a new or an existing identification tag. In some embodiments, the animal health product sticker can be attached to an impregnated livestock tag attached to an animal's ear in which the insecticide is used up.

In one aspect, in accordance with some implementations, the specification describes methods and systems including an animal health product container, comprising a body, a bonding material and a pull tab. The body has a first face and a second face. The body is constructed of a weather resistant material impregnated with an animal health product compound, such as an insecticide compound. The bonding material is attached to the first face of the body. The bonding material is configured to be weather resistant and to allow the body to be removably attached to a tag body of a tag for an animal. The pull-tab is attached to the body. The pull tab is devoid of the bonding material.

In another aspect, the present disclosure describes a method of making an animal health product container. In this method, the following steps can be performed in any order: applying an animal health product compound to a body having a first face and a second face, the body constructed of a weather resistant material; applying a bonding material to at least a portion of the first face of the body, the bonding material being weather-resistant; and forming the body into a predetermined shape configured to be attached to a tag body of a tag for an animal, the body having a pull tab.

In another aspect, the present disclosure describes a method including the steps of: connecting a first body of a first animal health product container to a surface of a tag connected to an animal; and after an amount of time, replacing the first animal health product container with a second animal health product container without removing the tag from the animal by: removing the first body of the first animal health product container from the surface of the tag; and connecting a second body of a second animal health product container to the tag body of the tag connected to the animal.

BRIEF DESCRIPTION OF THE DRAWING

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
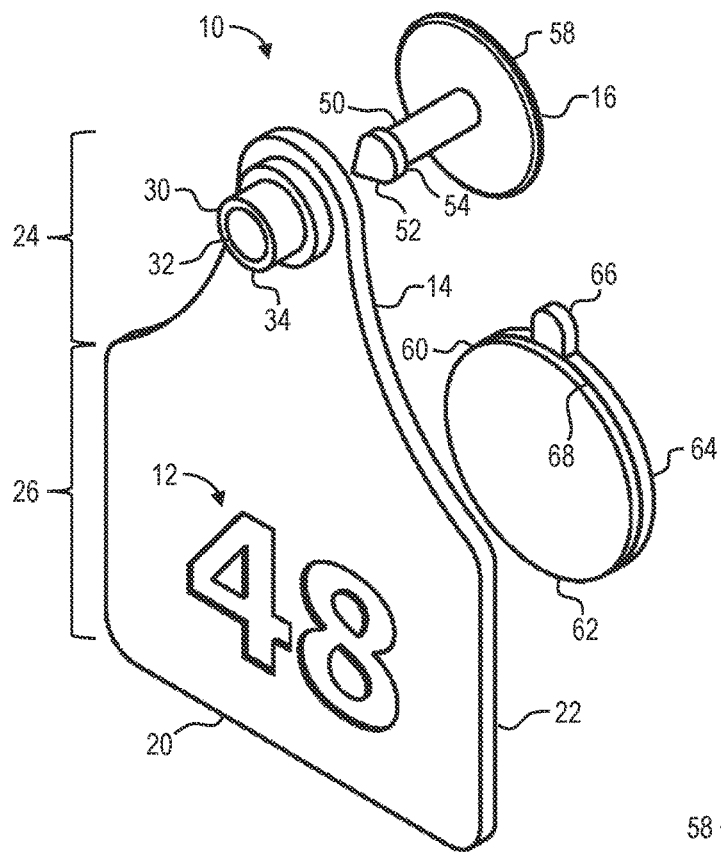
FIG. 1 is a front perspective exploded view of a two-piece ear tag and animal health product container constructed in accordance with one implementation of the presently disclosed inventive concepts.

The following detailed description of example embodiments refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein any reference to "one implementation" or "an implementation" means that a particular element, feature, structure, or characteristic described in connection with the implementation is included in at least one embodiment. The appearances of the phrase "in one implementation" in various places in the specification are not necessarily all referring to the same implementation.

As used herein, "animal health product compound" refers to a product that may be FDA approved and is designed to be applied to an animal to improve the health of the animal. Exemplary animal health product compounds include insecticide compounds, calming compounds, compounds configured for transdermal delivery (optionally including a skin penetration enhancer such as propylene glycol, alcohol, or a surfactant), and the like. Exemplary compounds configured for transdermal delivery, i.e., through the skin, include drugs/medications configured to supply hormones, vitamin supplements, pain relief, and to treat motion sickness.

As used herein, "insecticide compound" refers to a substance used for repelling, regulating growth, sterilization, or by any other way reducing the harmful effects of a parasite, such as a variety of active ingredients approved by the EPA, including but not limited to, pyrethroid, permethrin, zeta-cypermethrin, ivermectin, avermectin, abamectin, milbemectin, diazinon, chlorpyrifos, macrocyclic lactone, organophosphates, or combination thereof. Further, natural ingredients, including but not limited to, lemongrass and citrus oils may be used.

The term "container" as used herein refers to an object that can be used to hold or transport an animal health product compound.

Figure 2:
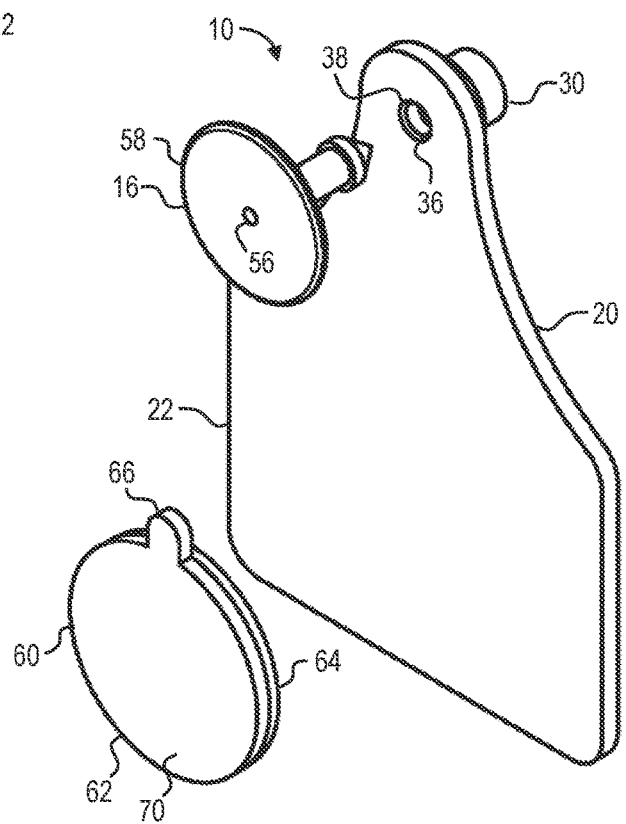
FIG. 2 is a rear perspective exploded view of the two-piece ear tag and animal health product container shown in FIG. 1.
Figure 3:
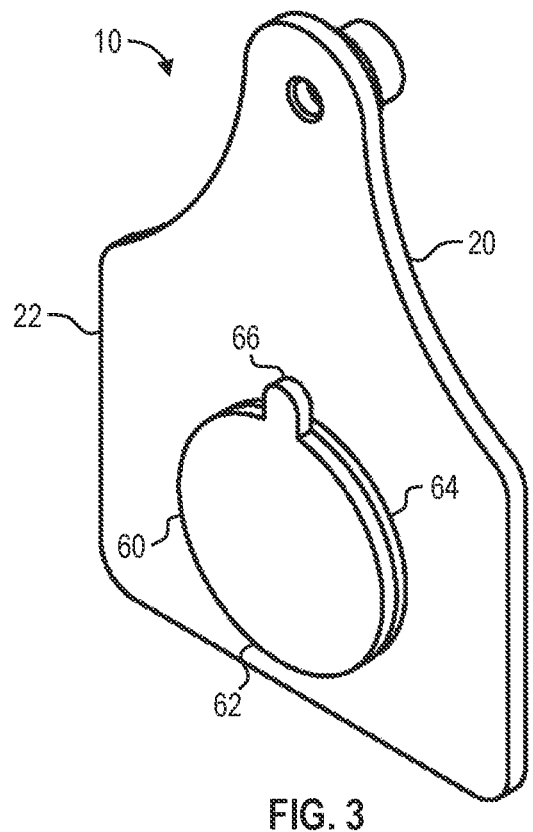
FIG. 3 is a rear perspective view of the animal health product container attached to a rear face of the two-piece ear tag shown in FIGS. 1 and 2.

Reference will now be made to the drawing in which the same reference numbers are used throughout the different figures to designate the same or similar components. Referring now to FIGS. 1-3, shown therein is a two-piece livestock identification ear tag 10 (which may be referred to herein as "identification tag 10") of the type which is commonly used to provide an identification number 12 (or other useful indicia) for visual identification of livestock. The identification tag 10 may be provided with a tag body 14 and an attachment button 16 used to secure the tag body 14 to an ear of an animal as is known in the art.

The tag body 14 may be molded from a weather resistant and reasonably flexible material, such as a urethane plastic, other suitable plastic, or the like, which is sufficiently flexible that the identification tag 10 can be bent and twisted during use.

The tag body 14 may be provided with a front face 20, a rear face 22, an upper portion 24, and a lower portion 26. The upper portion 24 of the identification tag 10 may be provided with a circular boss 30 with a first aperture 32 that extends a predetermined distance into the circular boss 30 from a first end 34 and a second aperture 36 extending through the circular boss 30 from a second end 38. The first aperture 32 may be provided with a first diameter that is larger than a second diameter of the second aperture 36. The second aperture 36 may be coaxially aligned with the first aperture 32.

To attach this identification tag 10 to the ear of livestock, the attachment button 16 is provided with an elongated shaft 50 terminating in a pointed tip 52 having a collar 54. The pointed tip 52 may be passed through the ear of the livestock and through the second aperture 36 to seat the collar 54 in the first aperture 32 of the circular boss 30. The attachment button 16 may be provided with an alignment aperture 56 that extends from a face 58 a predetermined distance into the elongated shaft 50, the alignment aperture 56 configured to receive a portion of a tag applicator (not shown) to assist in alignment of the attachment button 16 as the pointed tip 52 of the attachment button 16 is being inserted into the ear of the livestock and into the second aperture 36 to seat the collar 54 in the first aperture 32 of the circular boss 30.

The structure which has been described thus far is a conventional widely used livestock identification ear tag such as the one described in U.S. Pat. No. 3,260,007 which is incorporated herein by reference in its entirety. Normally, such an identification tag simply provides the function of identifying an animal regarded as an asset, such as a cow, sheep, goat or the like much in the manner of a brand. Livestock identification tags may be applied to multiple animals for a particular herd by providing each animal with a specific identification number 12 such as illustrated in FIG. 1. In accordance with one implementation of the presently disclosed concepts, at least one animal health product dispensing container 60 may be removably attached to each of the identification tags 10 (only one of which is shown in FIG. 1 for purposes of clarity). The animal health product dispensing container 60 (which may be referred to herein in some embodiments as an "animal health product sticker 60") may be configured to continuously and passively or actively dispense an animal health product compound, such as an insecticide compound for a period of time onto a portion of an animal to control, repel, and/or prevent flies or other parasites from pestering the animal to which the identification tag 10 is attached.

When the insecticide compound is used up or otherwise becomes ineffective, at least a portion of the animal health product dispensing container 60 may be removed from the identification tag 10 and thrown away without removing the identification tag 10 from the ear of the animal. Then, a new animal health product dispensing container 60 (or portion thereof) may be placed on the identification tag 10 to continue dispensing insecticide compound onto the animal without requiring any removal or modification whatsoever of the identification tag 10.

The animal health product container 60 is provided with a body 62, a bonding material 64, and a pull-tab 66 which may be formed as part of the body 62.

The body 62 has a first face 68 and a second face 70 opposite the first face 68. The body 62 forms a reservoir for holding and dispensing an animal health product compound, such as an insecticide compound from the animal health product container 60. A size (e.g., width and breadth) and depth of the body 62 may be configured to provide a predetermined surface area to dispense a predetermined amount of animal health product compound, such as insecticide for a predetermined amount of time. For instance, the predetermined amount of insecticide may be different for each type of animal and/or the type of parasite, e.g., insect or insects that are being controlled. Further, the predetermined amount of time the animal health product container 60 is designed to be effective for may determine the predetermined surface area of the body 62. For instance, in northern climates, a season for biting flies, nuisance flies, and other ectoparasites may be shorter when compared to a southern climate. As a result, the animal health product container 60 designed for and/or marketed to livestock producers in the northern climate may have a smaller surface area than one designed for and/or marketed to livestock producers in the southern climate.

The body 62 may be made of a weather resistant material, such as a thermoplastic material such as flexible polyvinyl chloride, which is impregnated with one or more insecticide compounds. The insecticide compound gradually and continually migrates to the surface of the body 62 and is passively rubbed onto the hair and/or skin of the animal, for instance as the animal moves. The insecticide compound may be one which kills, repels, regulates growth, sterilizes, or by any other way reduces the harmful effects of ectoparasites, including insects, ticks, and other lower forms of life which attack the animal. The body 62 can be round or any other geometric or fanciful shape.

The bonding material 64 may be applied or attached to the first face 68 of the body 62 which may be referred to herein as a back or backside of the body 62. The term "bonding material" when used herein can mean an adhesive, frequently a pressure sensitive adhesive, or a cohesive or an adhesive/cohesive combination, having adhesive qualities (i.e., qualities of adhesion or adhesion/cohesion, respectively) sufficient to effect the connection between the body 62 and a portion of the identification tag 10, such as the tag body 14 in a weather resistant manner for a period of time in a range from one month to four months and also permitting the body 62 to be removed from the identification tag 10 (e.g., tag body 14) without damaging the tag body 14. For example, the bonding material 64 may be selected from commercially available adhesives that are capable of resisting separation of the animal health product container 60 from the identification tag 10 under normal load conditions for a predetermined period of time, but that does not have such strong adhesion that the animal health product container 60 may not be removed when desired without destroying or damaging the tag body 14 of the identification tag 10 (e.g., when the insecticide is used up). The predetermined period of time may be within a range up to six months, e.g., from one month to six months. In one preferred implementation, the bonding material 64 is a biodegradable, polymer-based pressure sensitive adhesive, such as the one described in an article entitled "Sustainable polycarbonate adhesives for dry and aqueous conditions with thermoresponsive properties" published in Nature Communications 10, 5478 (2019) (accessed at https://doi.org/10.1038/s41467-019-13449-y), may be used.

The pull-tab 66 may be used to remove the animal health product container 60 from the identification tag 10. The pull-tab 66 extends from the body 62 and provides additional leverage to allow easier removal of the animal health product container 60. The pull-tab 66, while extending from the body 62, may not be impregnated with the insecticide compound and may be devoid of the bonding material 64.

For example, when the bonding material 64 is applied to the body 62, the bonding material 64 may not be applied to the pull-tab 66.

In some implementation, the pull-tab 66 may be constructed of a different material than the body 62. For instance, the pull-tab 66 may be constructed of a flexible material such as urethane plastic, other suitable plastic, or the like.

Figure 4:
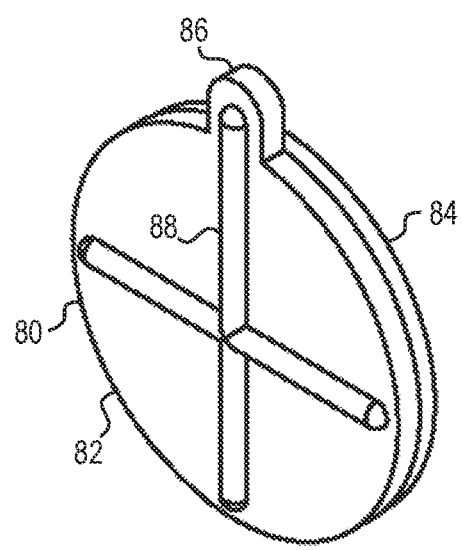
FIG. 4 is a front perspective view of another animal health product container having a pull-tab and reinforcement members constructed in accordance with one implementation of the presently disclosed inventive concepts.

Referring now to FIG. 4, shown therein is an animal health product container 80. The animal health product container 80 is similar to the animal health product container 60. Therefore, in the interest of brevity, only the differences will be described in detail herein. The animal health product container 80 may be provided with a body 82, a bonding material 84, a pull-tab 86 which may be formed as part of the body 82, and reinforcement members 88 that may be formed in the body 82 and connected to the pull-tab 86.

The pull-tab 86 and reinforcement members 88 may be constructed of a weather resistant material that is flexible but stronger than a material that forms the body 82. For instance, the pull-tab 86 and reinforcement members 88 may be constructed of a urethane plastic, other suitable plastic, or the like. The pull-tab 86 and the reinforcement members 88 may be interconnected or formed together. Because the body 82 may be formed of a thermoplastic material such as flexible polyvinyl chloride which is relatively soft, the pull-tab 86 and the reinforcement members 88 may aid in the removal of the animal health product container 80 when the animal health product container 80 is adhered to the identification tag 10, for instance.

Figure 5:
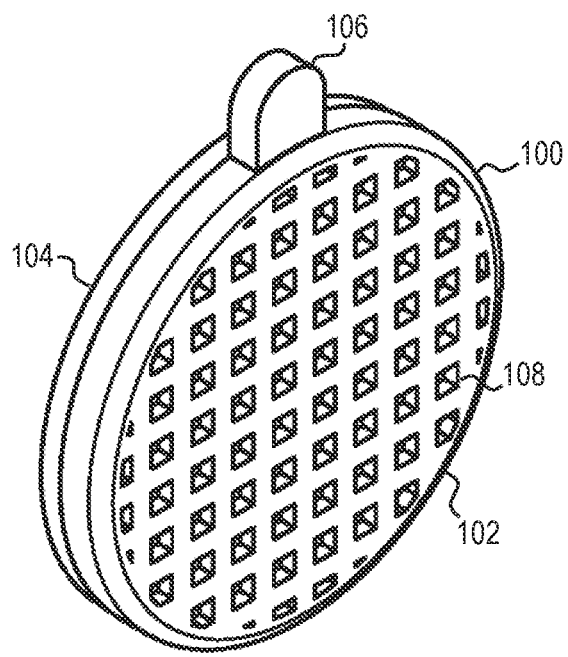
FIG. 5 is a front perspective view of another animal health product container having a waffle-like grid pattern for storing and delivering an animal health product compound constructed in accordance with one implementation of the presently disclosed inventive concepts.

Referring now to FIG. 5, shown therein is an animal health product container 100. The animal health product container 100 is similar in construction and function as the animal health product container 60. The animal health product container 100 may be provided with a body 102, a bonding material 104, and a pull-tab 106 which may be formed as part of or attached to the body 102. Due to the similarities between the animal health product container 100 and the animal health product container 60, generally only the differences between the animal health product container 100 and the animal health product container 60 will be discussed hereinafter.

The body 102 may be provided with a number of waffle-like indentations 108 (only one of which is labeled in FIG. 5) which may be filled with an insecticide compound and then covered with a semi-porous material (not shown). The insecticide compound which is placed in the indentations 108 in the body 102 and the semi-porous cover material are selected so that the insecticide compound slowly passes through or releases through the semi-porous cover material to dispense the insecticide compound to be rubbed off onto an animal wearing the identification tag 10 or onto another animal with which the tagged animal comes into contact.

Figure 6:
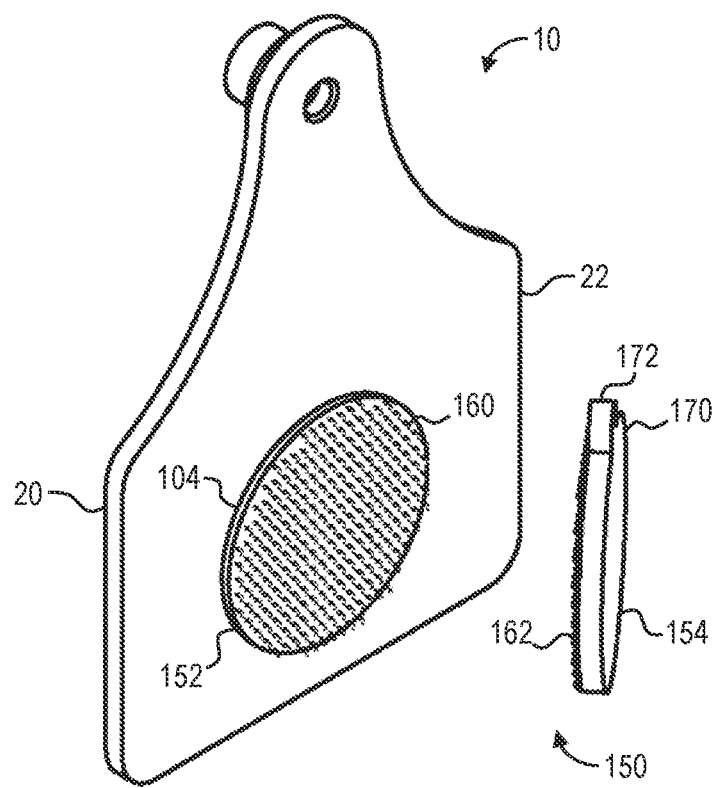
FIG. 6 is a rear exploded perspective view of a two-part animal health product container system having a fixed part and a removable part having cooperating components (e.g., hook and loop or interconnecting mushroom shaped components) constructed in accordance with one implementation of the presently disclosed inventive concepts.

Referring now to FIG. 6, shown therein is a two-part animal health product container system 150 that may be removably attached to the identification tag 10. The animal health product container system 150 may be provided with a fixed portion 152 and a removable portion 154.

The fixed portion 152 may be permanently or semi-permanently (e.g., riveted, welded, bolted, epoxied, etc.) attached to the front face 20 or the rear face 22 of the identification tag 10 and provides an attachment point for the removable portion 154. To attach the removable portion 154, the fixed portion 152 may be provided with a first component 160 (the first component 160 is illustrated by way of example as a hook component) and the removable portion 154 may be provided with a second component 162 (the second component 162 is illustrated by way of example as a loop component) of cooperating hook-and-loop components. There are several well-known brands of hook-and-loop fasteners of which Velcro® is an immediately recognizable example.

The removable portion 154 may be provided with a body 170 and a pull-tab 172. The body 170 may be impregnated with insecticide compound as described above. The fixed portion 152 may or may not be impregnated with insecticide compound as described above.

Figure 7:
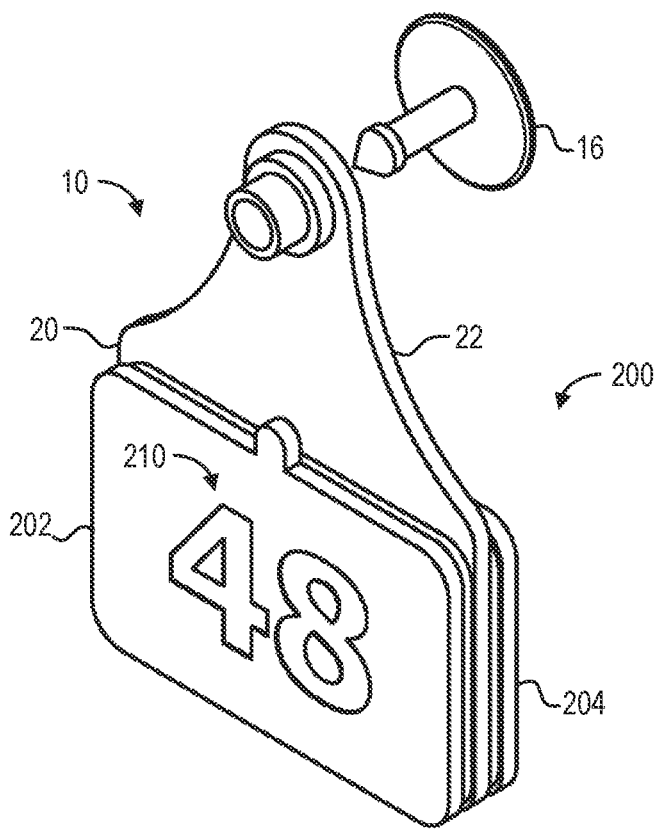
FIG. 7 is a perspective view of an animal health product container that includes an identification indicia such as an identification number constructed in accordance with one implementation of the presently disclosed inventive concepts.

Referring now to FIG. 7, shown therein is an animal health product container system 200 that may be removably attached to the identification tag 10. The container system 200 may be provided with a first animal health product container 202 and a second animal health product container 204. The first animal health product container 202 and the second animal health product container 204 are similar to the animal health product container 60 described above. Therefore, in the interest of brevity, only the differences will be described in detail herein.

The first animal health product container 202 may be attached to the front face 20 of the identification tag 10 and the second animal health product container 204 may be attached to the rear face 22. Because the first animal health product container 202 may cover the identification number 12, the first animal health product container 202 may be provided with an identification number 210 (or other useful indicia) that may be the same number as the identification number 12.

Alternatively, the first animal health product container 202 may be provided with a marking surface that allows a user to add an identification number or other useful indicia so that the identification tag 10 still provides the function of identifying the livestock.

It should be noted that in some implementations, only the first animal health product container 202 that includes the identification number 210 may be provided and used to attach to the front face 20 while nothing is attached to the rear face 22 of the identification tag 10.

Figure 8:
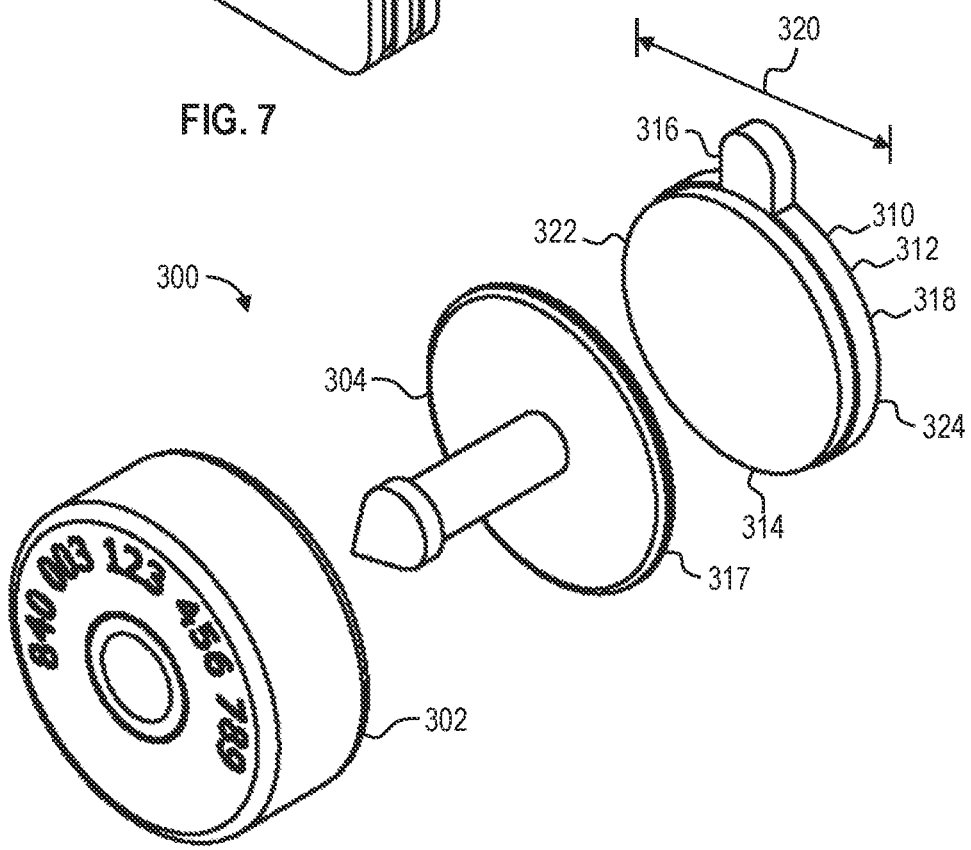
FIG. 8 is an exploded perspective view of an identification container configured to be attached to an attachment button of an identification tag, such as an RFID identification tag system constructed in accordance with one implementation of the presently disclosed inventive concepts.

Referring now to FIG. 8, shown therein is an identification tag system 300 that may be provided with a radio frequency identification portion 302 and an attachment button 304. The identification tag system 300 may be a commercially available system such as the HDX RFID tag sold by Y-Tex®, Inc. (further information can be found at: https://www.y-tex.com/livestock-identification-tags/rfid-tags/product/white-rfid-large-hdx).

To provide protection from insects, an animal health product container 310 may be provided. The animal health product container 310 may be similar to the animal health product container 60, 80 or the animal health product container system 150 described above. Therefore, in the interest of brevity, only the differences will be described in detail herein.

The animal health product container 310 may be provided with a body 312, a bonding material 314, and a pull-tab 316 which may be formed as part of the body 312. The animal health product container 310 may be sized and shaped to be removably attached to an exterior surface 317 of the attachment button 304.

In some embodiments, the body 312 has an outer peripheral edge 318 having a cross-sectional dimension 320 extending across the body 312 from a first portion 322 of the outer peripheral edge 318 to a second portion 324 of the outer peripheral edge 318 opposite from the first portion 322. The cross-sectional dimension 320 may be within a range from one inch to one and one-half inch. As shown in FIG. 8, the body 312 may have a circular shape and in this embodiment, the cross-sectional dimension 320 is a diameter.

Figure 9:
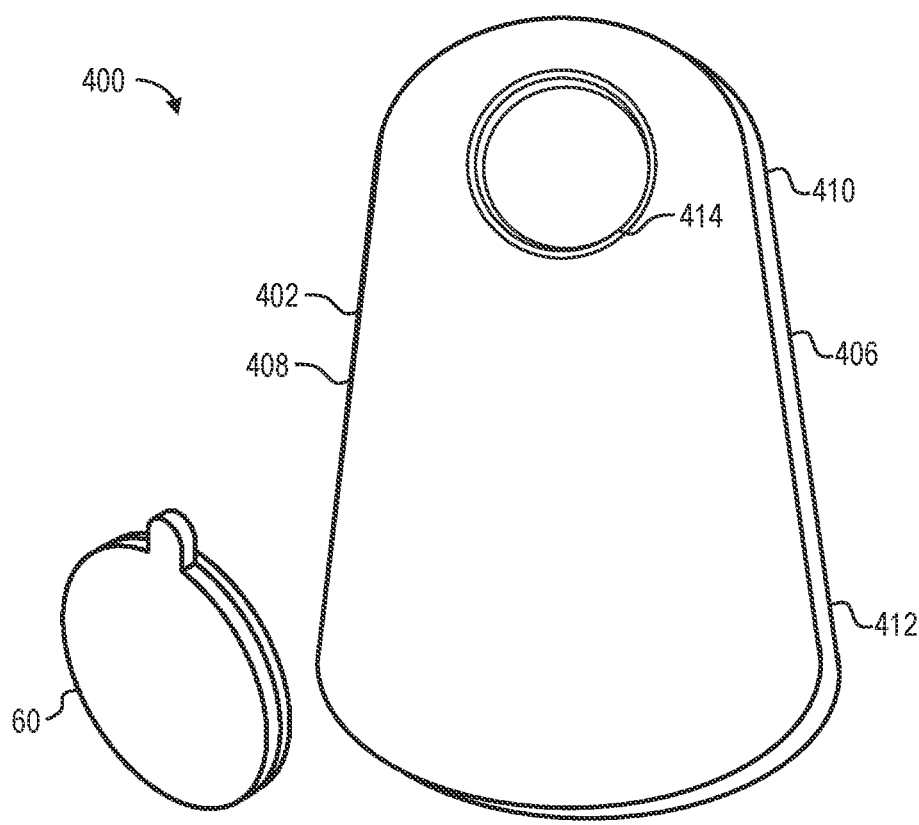
FIG. 9 is a rear perspective exploded view of an identification tag configured to receive a strap and an animal health product container constructed in accordance with one implementation of the presently disclosed inventive concepts.

Referring now to FIG. 9, shown therein an identification tag system 400 having an identification tag 402 configured to receive a strap (not shown) that may be used to attach the identification tag 402 to an animal such as by placing the strap around the animal's neck or ankle.

The identification tag 402 may be provided with a tag body 404 that may be provided with a front face 406, a rear face 408, an upper portion 410, and a lower portion 412. The upper portion 410 of the identification tag 402 may be provided with an aperture 414 that extends through the tag body 404 from the front face 406 to the rear face 408. The aperture 414 may be sized and shaped to receive at least a portion of the strap to secure the identification tag 402 to the animal. While not shown, the identification tag 402 may be provided with an identification number on the front face 406, the rear face 408, or both the front face 406 and the rear face 408 to help with visual identification of the animal as is known in the art.

The identification tag system 400 may be provided with the animal health product container 60 constructed as described above. The animal health product container 60 may be removably attached to the front face 406 or the rear face 408 of the identification tag 402. The animal health product dispensing container 60 may be configured to continuously and passively or actively dispense an insecticide compound for a period of time onto a portion of the animal to control, repel, and/or prevent flies or other parasites from pestering the animal to which the identification tag 402 is attached.

In some embodiments, the inventive concepts disclosed herein are directed to a method of making and using the animal health product container 60, 80, or 310. For purposes of clarity, the methods will be described in conjunction with the animal health product container 60. However, the method is equally applicable to the animal health product containers 80 and 310. The method comprises, in any order, applying the insecticide compound to the body 62 having the first face 68 and the second face 70, the body constructed of a weather resistant material; applying the bonding material 64 to at least a portion of the first face 68 (or the entire first face 68) of the body 62, the bonding material 64 being weather-resistant; and forming the body 62 into a predetermined shape configured to be attached to a surface (e.g., the front face 20, the rear face 22 or the surface 317 of the identification tag 10 for an animal, the body 62 having a pull tab 66.

To use the animal health product containers 60, 80 or the animal health product container system 150, the first body 62 of the first animal health product container 60 is connected to a surface (e.g., the front face 20, the rear face 22, or the surface 317) of the identification tag 10 connected to an ear of an animal. After an amount of time (which can be between one and four months, for example), the first animal health product container 60 is replaced with a second animal health product container 60 without removing the identification tag 10 from the ear of the animal by: removing the first body 62 of the first animal health product container 60 from the surface of the identification tag 10; and connecting the second body 62 of a second animal health product container 60 to the surface of the identification tag 10 connected to the ear of the animal.

The step of connecting the first body 62 of the first animal health product container 60 to the surface of the identification tag 10 may be defined further as applying a first bonding material 64 on the first body 62 of the first animal health product container 60 to the surface of the identification tag 10 connected to the ear of the animal.

In other embodiments such as the animal health product container system 150, the step of connecting the first body 62 of the first animal health product container 60 to the surface of the identification tag 10 is defined further as attaching in a permanent or semi-permanent manner the fixed portion 152 of the first animal health product container 60 to the surface of the identification tag 10, and attaching the removable portion 154 having the body 170 impregnated with an insecticide compound to the fixed portion 152.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure. For instance, Identification tags may take other forms such as a single-piece identification tag, an EIN button tag, a neck band identification strip, and a neck band identification tag and one or more of the animal health product container implementations described above may be adapted to be attached thereto.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. An animal health product container, comprising:
    a body having a first face and a second face, the body constructed of a weather resistant material impregnated with an animal health product compound;
    a bonding material attached to the first face of the body, the bonding material configured to be weather resistant and allow the body to be removably attached to a tag body of a tag for an animal; and
    a pull-tab attached to the body, the pull tab devoid of the bonding material.

2. The animal health product container of claim 1, wherein the body is constructed of a thermoplastic material impregnated with the animal health product compound.

3. The animal health product container of claim 2, wherein the thermoplastic material is a flexible polyvinyl chloride.

4. The animal health product container of claim 1, wherein the body is constructed of a first material and the pull-tab is constructed of a second material that is different than the first material.

5. The animal health product container of claim 4, wherein the first material is a thermoplastic material impregnated with the animal health product compound and the second material is a urethane plastic.

6. The animal health product container of claim 1, wherein the animal health product compound is an insecticide compound selected from a group consisting of one or more of a pyrethroid, permethrin, zeta-cypermethrin, ivermectin, avermectin, abamectin, milbemectin, diazinon, chlorpyrifos, macrocyclic lactone, and an organophosphate.

7. The animal health product container of claim 1, wherein the bonding material is a biodegradable, polymer-based pressure sensitive adhesive.

8. The animal health product container of claim 1, wherein the body has an outer peripheral edge having a cross-sectional dimension extending across the body from a first portion of the outer peripheral edge to a second portion of the outer peripheral edge opposite from the first portion, the cross-sectional dimension being within a range from one inch to one and one-half inch.

9. The animal health product container of claim 8, wherein the body has a circular shape and the cross-sectional dimension is a diameter.

10. The animal health product container of claim 1, wherein the animal health product compound is a calming compound.

11. The animal health product container of claim 1, wherein the animal health product compound is a compound configured for transdermal delivery.

\* \* \* \* \*